United States Patent
Hsu

(10) Patent No.: US 10,955,944 B2
(45) Date of Patent: Mar. 23, 2021

(54) TOUCH-CONTROL ELECTRONIC APPARATUS AND TOUCH PAD DEVICE THEREOF

(71) Applicant: CHICONY ELECTRONICS CO., LTD., New Taipei (TW)

(72) Inventor: Cheng-Chi Hsu, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 16/580,102

(22) Filed: Sep. 24, 2019

(65) Prior Publication Data

US 2020/0272258 A1 Aug. 27, 2020

(30) Foreign Application Priority Data

Feb. 27, 2019 (TW) ................. 108106825

(51) Int. Cl.
| | | |
|---|---|---|
| *G06F 3/0354* | (2013.01) | |
| *G06F 1/16* | (2006.01) | |
| *G06F 3/041* | (2006.01) | |
| *G06F 3/0338* | (2013.01) | |
| *G06F 3/0362* | (2013.01) | |

(52) U.S. Cl.
CPC .......... *G06F 3/03547* (2013.01); *G06F 1/169* (2013.01); *G06F 3/0338* (2013.01); *G06F 3/0362* (2013.01); *G06F 3/041* (2013.01); *G06F 3/0414* (2013.01); *G06F 3/0416* (2013.01); *G06F 3/04142* (2019.05); *G06F 2203/04103* (2013.01)

(58) Field of Classification Search
CPC ............ G06F 3/03547; G06F 3/04142; G06F 3/0338; G06F 3/0362; G06F 3/041; G06F 3/0416; G06F 3/0414; G06F 2203/04103; G06F 1/169
See application file for complete search history.

(56) References Cited

U.S. PATENT DOCUMENTS

| | | | |
|---|---|---|---|
| 7,499,040 B2 | 3/2009 | Zadesky et al. | |
| 9,477,328 B2 * | 10/2016 | Clayton | ............... G06F 3/03547 |
| 2005/0052425 A1 * | 3/2005 | Zadesky | ................. G06F 3/041 |
| | | | 345/173 |
| 2010/0328234 A1 * | 12/2010 | Lu | ........................... G06F 3/044 |
| | | | 345/173 |
| 2015/0131221 A1 * | 5/2015 | Lin | ....................... G06F 1/1613 |
| | | | 361/679.21 |

FOREIGN PATENT DOCUMENTS

TW I273467 B 2/2007

* cited by examiner

*Primary Examiner* — Brent D Castiaux
(74) *Attorney, Agent, or Firm* — Muncy, Geissler, Olds & Lowe, P.C.

(57) ABSTRACT

A touch pad device applied to a touch-control electronic apparatus which has a case including an opening is disclosed. The touch pad device includes a touch pad, a supporting unit and a pressing unit. The touch pad includes a circuit board which has a circuit board main body and a plurality of circuit board coupling parts. The circuit board main body is exposed at the opening. The circuit board coupling parts are symmetrically disposed at the edge of the circuit board main body, and the circuit board coupling parts are coupled to the case. The supporting unit is disposed under and supports the touch pad. The pressing unit is located between the circuit board main body and the supporting unit.

18 Claims, 6 Drawing Sheets

TOUCH-CONTROL ELECTRONIC APPARATUS AND TOUCH PAD DEVICE THEREOF

BACKGROUND OF THE INVENTION

1. Field of the Invention

The present invention relates to a touch-control electronic apparatus and a touch pad device thereof; more particularly, the present invention relates to a touch-control electronic apparatus and a touch pad device thereof which have more touch positions.

2. Description of the Related Art

The notebook computer usually has a touch pad allowing the user to operate the notebook computer via touching (such as using the finger to slide or press on the touch pad) without using a computer mouse. In the structure of the touch pad of the prior art, one side of the touch pad is pivotally connected to an axis of the notebook computer, and the opposite side of the touch pad, which is not pivotally connected to the notebook computer can move upwardly and downwardly, such that the touch pad can be pressed by the user to trigger the corresponding program action.

However, the side pivotally connected to the axis cannot move upwardly and downwardly because of the pivotal connection, so the area of the touch pad close to that side cannot trigger the corresponding program action based on the pressing action of the user; therefore, a large area of the touch pad of the prior art is insensitive to the pressing and touching action.

Therefore, there is a need to provide a new touch pad device which has more touch positions.

SUMMARY OF THE INVENTION

It is an object of the present invention to provide a touch pad device which has more touch positions.

To achieve the abovementioned object, the touch pad device of the present invention is for being installed on a touch-control electronic apparatus. The touch-control electronic apparatus includes a case, and the case includes an opening. The touch pad device includes a touch pad, a supporting unit, and a pressing unit. The touch pad includes a circuit board, and the circuit board includes a circuit board main body and a plurality of circuit board coupling parts. The circuit board main body is exposed at the opening. The circuit board coupling parts are symmetrically disposed at the edge of the circuit board main body, and the circuit board coupling parts are coupled to the case. The supporting unit is located under the touch pad and supports the touch pad. The pressing unit is located between the circuit board main body and the supporting unit. When a pressing position on the circuit board main body is pressed, at least one of the circuit board coupling parts abuts against an edge of the opening such that the circuit board tilts with the at least one circuit board coupling part as a pivot point.

According to one embodiment of the present invention, the touch pad device further includes a positioning connector, wherein the positioning connector is located between the circuit board main body and the supporting unit and connected to the circuit board main body and the supporting unit.

According to one embodiment of the present invention, the touch pad further includes a protection board, and the protection board covers the circuit board main body.

According to one embodiment of the present invention, the supporting unit includes a supporting unit main body and at least one elastic part. The supporting unit main body is located under the circuit board main body. The elastic part is connected between the supporting unit main body and the circuit board main body.

According to one embodiment of the present invention, the plurality of circuit board coupling parts are coupled to at least one case combining part of the case, and the case combining part is disposed at the inner edge of the opening.

According to one embodiment of the present invention, the circuit board coupling part is a protruding dot, and the case combining part is a recess.

According to one embodiment of the present invention, the number of the case combining parts is plural; the plurality of case combining parts are symmetrically disposed at the inner edge of the opening.

According to one embodiment of the present invention, the case combining part is a protruding dot, and the circuit board coupling part is a recess.

Another object of the present invention is to provide a touch pad device for being installed on a touch-control electronic apparatus. The touch-control electronic apparatus includes a case, and the case includes an opening. The touch pad device includes a touch pad, a supporting unit, and a pressing unit. The touch pad includes a circuit board, and the circuit board includes a circuit board main body and a circuit board coupling part. The circuit board main body is exposed at the opening. The circuit board coupling part surrounds the edge of the circuit board main body, and the circuit board coupling part is coupled to the case. The supporting unit is located under the touch pad and supports the touch pad. The pressing unit is located between the circuit board main body and the supporting unit. When a pressing position on the circuit board main body is pressed, at least one area of the circuit board coupling part abuts against an edge of the opening such that the circuit board tilts with the at least one area of the circuit board coupling part as a pivot point.

According to one embodiment of the present invention, the circuit board coupling part is coupled to a case combining part of the case, the case combining part is disposed at an inner edge of the opening, the case combining part is an annular recess, and the circuit board coupling part is an annular plate.

Another object of the present invention is to provide a touch-control electronic apparatus which has more touch positions. To achieve the abovementioned object, the touch-control electronic apparatus of the present invention includes a case and a touch pad device. The case includes an opening. The touch pad device includes a touch pad, a supporting unit, and a pressing unit. The touch pad includes a circuit board, and the circuit board includes a circuit board main body and a plurality of circuit board coupling parts. The circuit board main body is exposed at the opening. The circuit board coupling parts are symmetrically disposed at the edge of the circuit board main body, and the circuit board coupling parts are coupled to the case. The supporting unit is located under the touch pad and supports the touch pad. The pressing unit is located between the circuit board main body and the supporting unit. When a pressing position on the circuit board main body is pressed, at least one of the circuit board coupling parts abuts against an edge of the opening such that the circuit board tilts with the at least one circuit board coupling part as a pivot point.

Another object of the present invention is to provide a touch-control electronic apparatus which has more touch positions. To achieve the abovementioned object, the touch-control electronic apparatus of the present invention includes a case and a touch pad device. The case includes an opening. The touch pad device includes a touch pad, a supporting unit, and a pressing unit. The touch pad includes a circuit board, and the circuit board includes a circuit board main body and a circuit board coupling part. The circuit board main body is exposed at the opening. The circuit board coupling part surrounds the edge of the circuit board main body, and the circuit board coupling part is coupled to the case. The supporting unit is located under the touch pad and supports the touch pad. The pressing unit is located between the circuit board main body and the supporting unit. When a pressing position on the circuit board main body is pressed, at least one area of the circuit board coupling part abuts against an edge of the opening such that the circuit board tilts with the at least one area of the circuit board coupling part as a pivot point.

DETAILED DESCRIPTION OF THE PREFERRED EMBODIMENT

Figure 1:
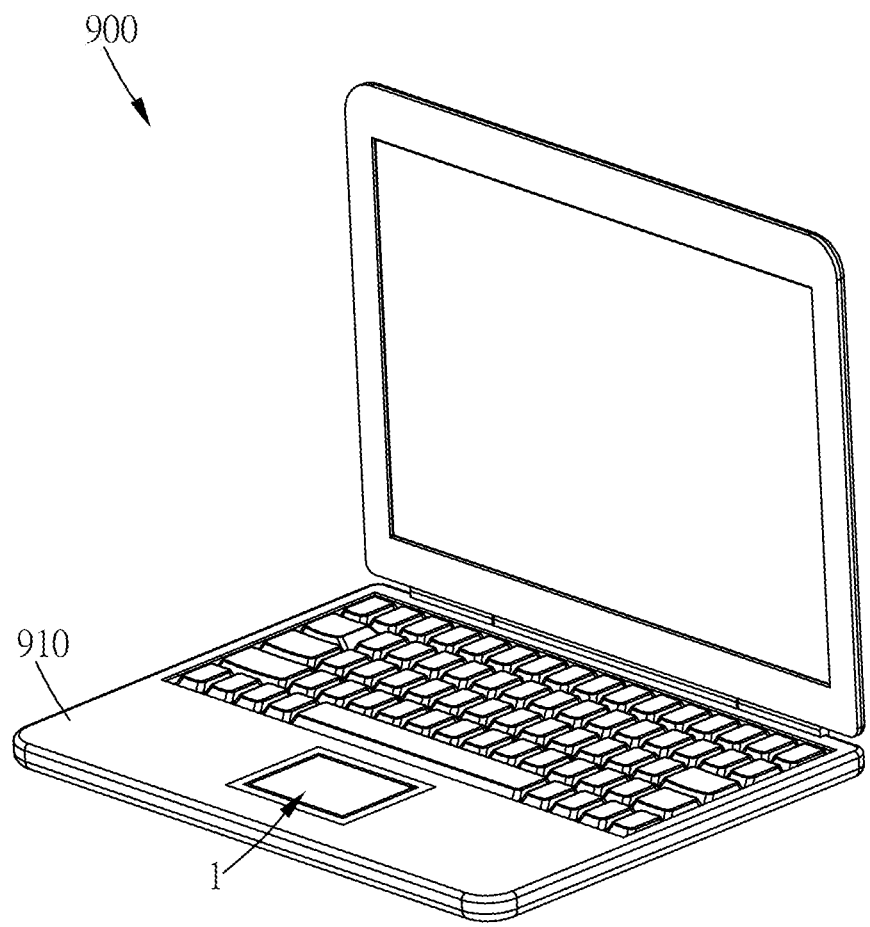
FIG. 1 illustrates a schematic drawing of a touch-control electronic apparatus in the first embodiment of the present invention.
Figure 2:
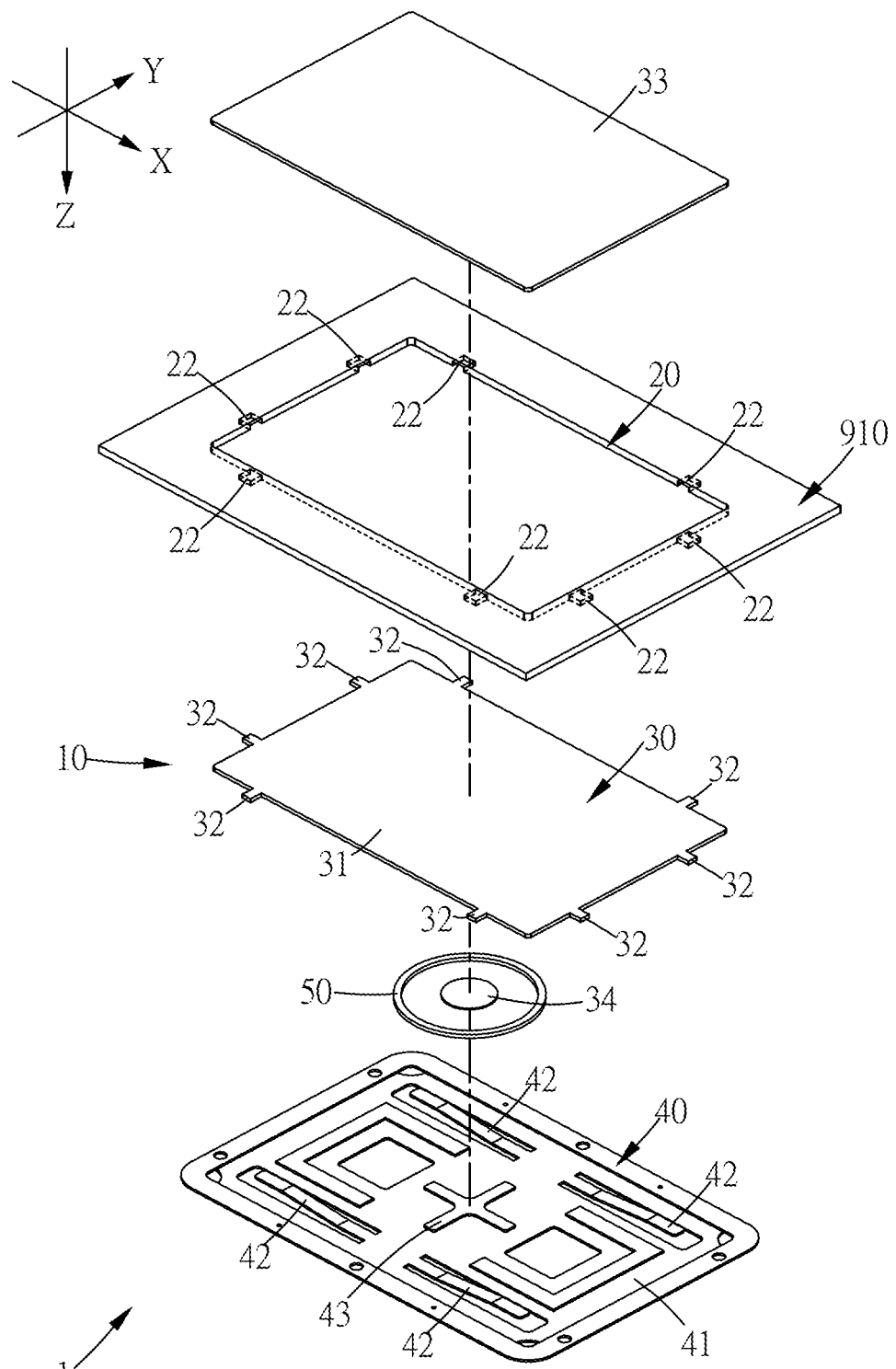
FIG. 2 illustrates an exploded assembly drawing of a touch pad device in the first embodiment of the present invention.
Figure 3:
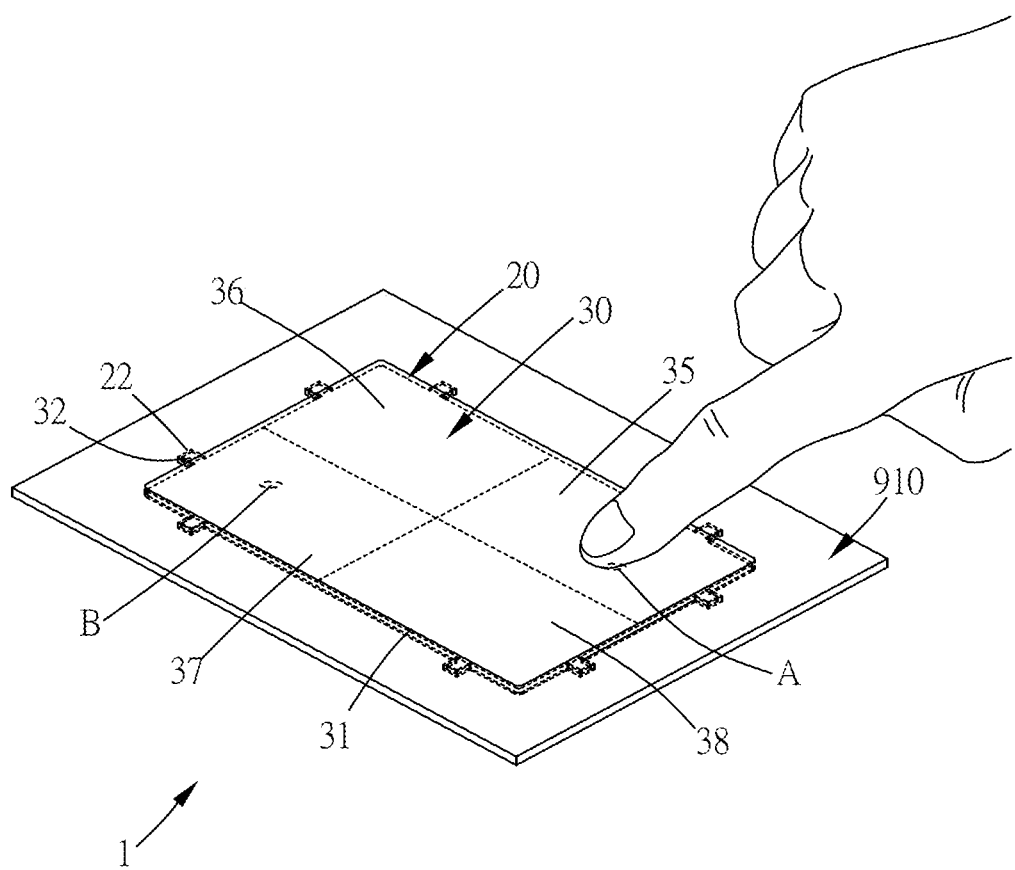
FIG. 3 illustrates a schematic drawing of the touch pad device which is pressed in the first embodiment of the present invention.

Please refer to FIG. 1 to FIG. 3, which illustrate a touch-control electronic apparatus and a touch pad device in the first embodiment of the present invention. FIG. 1 illustrates a schematic drawing of the touch-control electronic apparatus in the first embodiment of the present invention. FIG. 2 illustrates an exploded assembly drawing of the touch pad device in the first embodiment of the present invention. FIG. 3 illustrates a schematic drawing of the touch pad device which is pressed in the first embodiment of the present invention.

As shown in FIG. 1 and FIG. 2, in the first embodiment of the present invention, the touch-control electronic apparatus 900 is a notebook computer; the user can operate the touch-control electronic apparatus 900 via a touch-control action (such as using the finger to press or slide). For example, the user can use the finger to slide on the touch pad device 1 to control the mouse cursor position on the screen of the operating system of the touch-control electronic apparatus 900; alternatively, the user can use the finger to press the touch pad device 1 to trigger the touch pad device 1 such that the operating system of the touch-control electronic apparatus 900 generates a controlling signal. The touch-control electronic apparatus 900 includes a case 910 and a touch pad device 1. The case 910 is used for covering and protecting the electronic components in the touch-control electronic apparatus 900. The case 910 has an opening 20. In order to clearly describe the structure, FIG. 2 and FIG. 3 only illustrate a part of the case 910.

In the first embodiment of the present invention, the touch pad device 1 is installed in the case 910, and the touch pad device 1 can sense a variety of touch positions. The touch pad device 1 includes a touch pad 10, a supporting unit 40 and a positioning connector 50.

In the first embodiment of the present invention, as shown in FIG. 2 and FIG. 3, the opening 20 has eight case combining parts 22. The opening 20 is a rectangular opening. The eight case combining parts 22 are symmetrically disposed on the inner edge of the opening 20. The eight case combining parts 22 are all recesses, and the notch of each recess is toward the inside of the case 910; for example, the notch of each recess is toward the inside of the case 910 along the Z axis shown in FIG. 2. The case combining parts 22 are used for coupling to the touch pad 10. When the touch pad 10 is pressed, the case combining parts 22 coordinate with the touch pad 10 to form a pivot point.

In the first embodiment of the present invention, the touch pad 10 is installed in the opening 20 of the case 910 and exposed to the outside of the case 910 at the opening 20. The touch pad 10 is used for the user to control the mouse cursor (not shown in the figure) on the screen of the touch-control electronic apparatus 900 and for receiving a pressing force, sensing the pressing position A, and executing a corresponding function. The touch pad 10 includes a circuit board 30, a protection board 33 and a pressing unit 34. The protection board 33 covers the circuit board 30. The protection board 33 is configured to protect the circuit board 30 from being damaged by the external force and to be pressed by the user to transfer the pressing force to the circuit board 30. The circuit board 30 includes a circuit board main body 31 and eight circuit board coupling parts 32. The circuit board main body 31 is exposed at the opening 20, and the protection board 33 covers the circuit board main body 31. The eight circuit board coupling parts 32 are symmetrically disposed at the edge of the circuit board main body 31 for coupling to the case 20.

As per the abovementioned description, in the first embodiment of the present invention, the eight circuit board coupling parts 32 each are a protruding dot which protrude from one side of the circuit board main body 31, and the eight circuit board coupling parts 32 and the eight case combining parts 22 are respectively coupled to each other. Each of the circuit board coupling parts 32 extends to the outside along the X axis or Y axis shown in FIG. 2 from one side of the circuit board main body 31. The circuit board main body 31 and the eight circuit board coupling parts 32 can be integrally formed; for example, the circuit board coupling parts 32 can be formed by cutting the circuit board material. In the present embodiment, the eight circuit board coupling parts 32 are respectively coupled to the recesses of the eight case combining parts 22. When a pressing position (the pressing position A as a specific example shown in FIG. 2) on the circuit board main body 31 is pressed, the circuit board coupling part 32 and the case combining part 22 which are closest to the diagonal symmetric point B of the pressing position A can form a pivot point such that the circuit board main body 31 will tilt relative to the supporting unit 40 with the circuit board coupling part 32 as the pivot point. However, the numbers of the circuit board coupling part 32 and the case combining part 22 are not limited to eight, for the numbers can be changed according to design requirements. Further, it is to be known that, in the present embodiment, the coupling circuit board coupling parts 32 and the case combining parts 22 do not fit tightly together, for the recess of the case combining part 22 is slightly larger than the protruding dot of the circuit board coupling part 32; thus, when the circuit board 30 is pressed, the circuit board coupling parts 32 can respectively slightly move in the case combining parts 22 such that the whole circuit board 30 can slightly move to enhance the smoothness and feeling of pressing. The pressing unit 34 is located at the center and the bottom of the circuit board 30, and the pressing unit 34 is located between the circuit board main body 31 and the supporting unit 40.

In the first embodiment of the present invention, the supporting unit 40 is a metal plate located under the touch pad 10 and supports the touch pad 10. The supporting unit 40 includes a supporting unit main body 41 and four elastic parts 42. The supporting unit main body 41 is located under the circuit board main body 31. Each of the elastic parts 42 is connected between the supporting unit main body 41 and the circuit board main body 31. One end of each of the elastic parts 42 is connected to the supporting unit main body 41, and the other end of each of the elastic parts 42 is connected to the circuit board main body 31 such that a gap is maintained between the circuit board main body 31 and the supporting unit main body 41. After the circuit board 30 is pressed and consequently tilts, the circuit board 30 can return to the original position via the elastic force of the elastic parts 42; in the present embodiment, the four elastic parts 42 are respectively corresponded to the four corners of the supporting unit 40 and are symmetrical to each other such that the pressing unit 34 will maintain a distance from the supporting unit main body 41. Further, because one end of each of the elastic parts 42 is connected to the supporting unit main body 41 and the other end of each of the elastic parts 42 directly touches the circuit board main body 31, each of the elastic parts 42 can also provide a grounding function to allow the excess electronic power of the circuit board 30 to be transferred to the outside. The structure enhancing part 43 is disposed on the supporting unit main body 41. The structure enhancing part 43 is a protruding structure formed by denting the supporting unit main body 41 to enhance the whole structure of the supporting unit 40. The supporting unit 40 can be combined with the case 910 by a locking, pasting or hot-melting method.

In the first embodiment of the present invention, the positioning connector 50 is a ring-shaped elastic viscose film, the positioning connector 50 is corresponded to the center of the circuit board 30 and located between the circuit board main body 31 of the circuit board 30 and the supporting unit 40, and the positioning connector 50 is connected to the circuit board main body 31 of the circuit board 30 and the supporting unit 40. The positioning connector 50 is configured to keep the position of the circuit board 30 within a certain range via viscose stickiness to prevent the circuit board 30 from becoming displaced and loose along the horizontal direction (such as the X-Y plane shown in the figure) when being pressed, and the elasticity of the positioning connector 50 can cooperate with the pushing of the circuit board 30 such that the positioning connector 50 can be compressed.

As shown in FIG. 2 and FIG. 3, when the user presses the touch pad device 1, the user's finger can press the protection board 33, and the pressing force will be transferred to the circuit board main body 31 of the circuit board 30 via the protection board 33. When a pressing position on the circuit board main body 31 is pressed, at least one of the circuit board coupling parts 32 abuts against the edge of the opening 20; more particularly, the at least one of the circuit board coupling parts 32 abuts against the edge of the opening 20 and is interfered with by the case 910 at the edge of the opening 20, such that the circuit board 30 will tilt with the at least one circuit board coupling part 32 as a pivot point. For example, if the touch pad 10 is divided into a first area 35, a second area 36, a third area 37 and a fourth area 38, then when a pressing position A on the first area 35 is pressed, both the circuit board coupling part 32 and the case combining part 22 closest to the symmetric point B (wherein the symmetric point B is in the third area 37 and the third area 37 is located diagonally opposite to the pressing position A) will form a pivot point such that the circuit board main body 31 will present a significant tilt relative to the pivot point; therefore, the circuit board 30 will move the pressing unit 34 toward to the supporting unit main body 41 such that the pressing unit 34 will be triggered to generate a controlling signal. When the force of pressing the touch pad 10 disappears, then via the elastic potential energy of the elastic part 42, the circuit board main body 31 and the pressing unit 34 on the circuit board main body 31 will return to the original position. Alternatively, if the fourth area 38 is pressed, the circuit board coupling part 32 and the corresponding case combining part 22 in the second area 36, which is located diagonally opposite to the pressing position, will form a pivot point such that the circuit board main body 31 will tilt relative to the pivot point.

Therefore, no matter what position of the touch pad 10 is pressed, the diagonal position opposite to the pressing position will form a corresponding pivot point such that the circuit board main body 31 will tilt relative to the corresponding pivot point; thus, any position of the circuit board 30 can be pressed to be tilted, and the whole board of the circuit board 30 of the touch pad device 1 can be used for triggering the pressing unit 34, and there is no spot which is insensitive to a press on the touch pad device 1. When the central area of the touch pad 10 is pressed, the touch pad 10 will move downwardly to trigger the pressing unit 34; when the corner area of the touch pad 10 is pressed, the touch pad 10 will present the tilt action to trigger the pressing unit 34. When the touch pad 10 is pressed, the touch pad 10 will tilt with the circuit board coupling parts 32 as the pivot point to trigger the pressing unit 34, there is no spot which is insensitive to a press, and the pivot point will be formed at the edge of the opening 20; thus, the design of the pivot point on a single side of the prior art is improved such that the positions of multiple pivot points can be optionally changed based on the pressing position in the present invention. The abovementioned design allowing the circuit board coupling parts 32 to be pivot points which are located on the circuit board 30 can reduce the area occupied by the touch pad device in the case 910, and the overall thickness can be reduced. Further, when the touch pad 10 is pressed, one of the circuit board coupling parts 32 can function as the pivot point of the circuit board 30.

Figure 4:
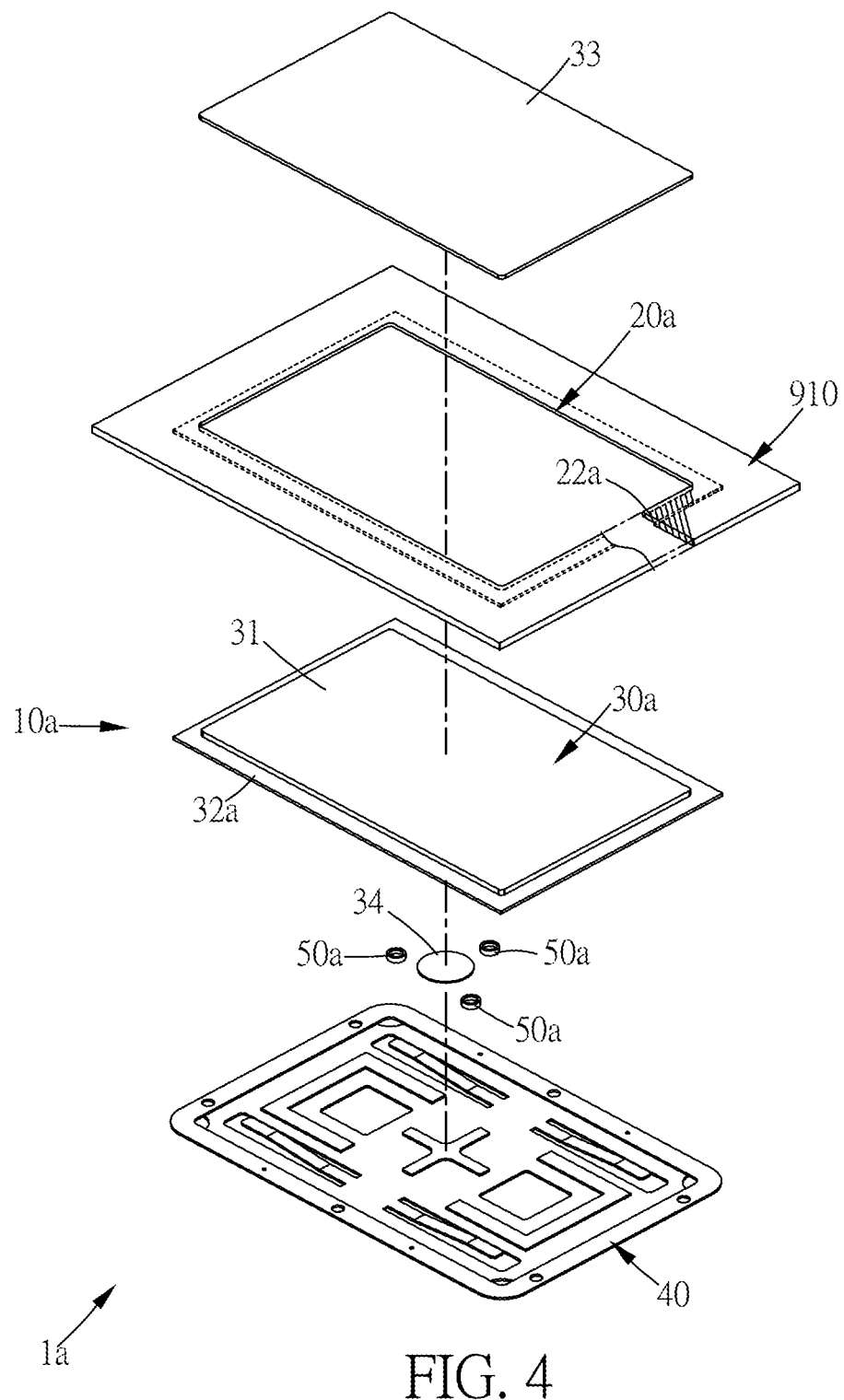
FIG. 4 illustrates an exploded assembly drawing of the touch pad device in the second embodiment of the present invention.
Figure 5:
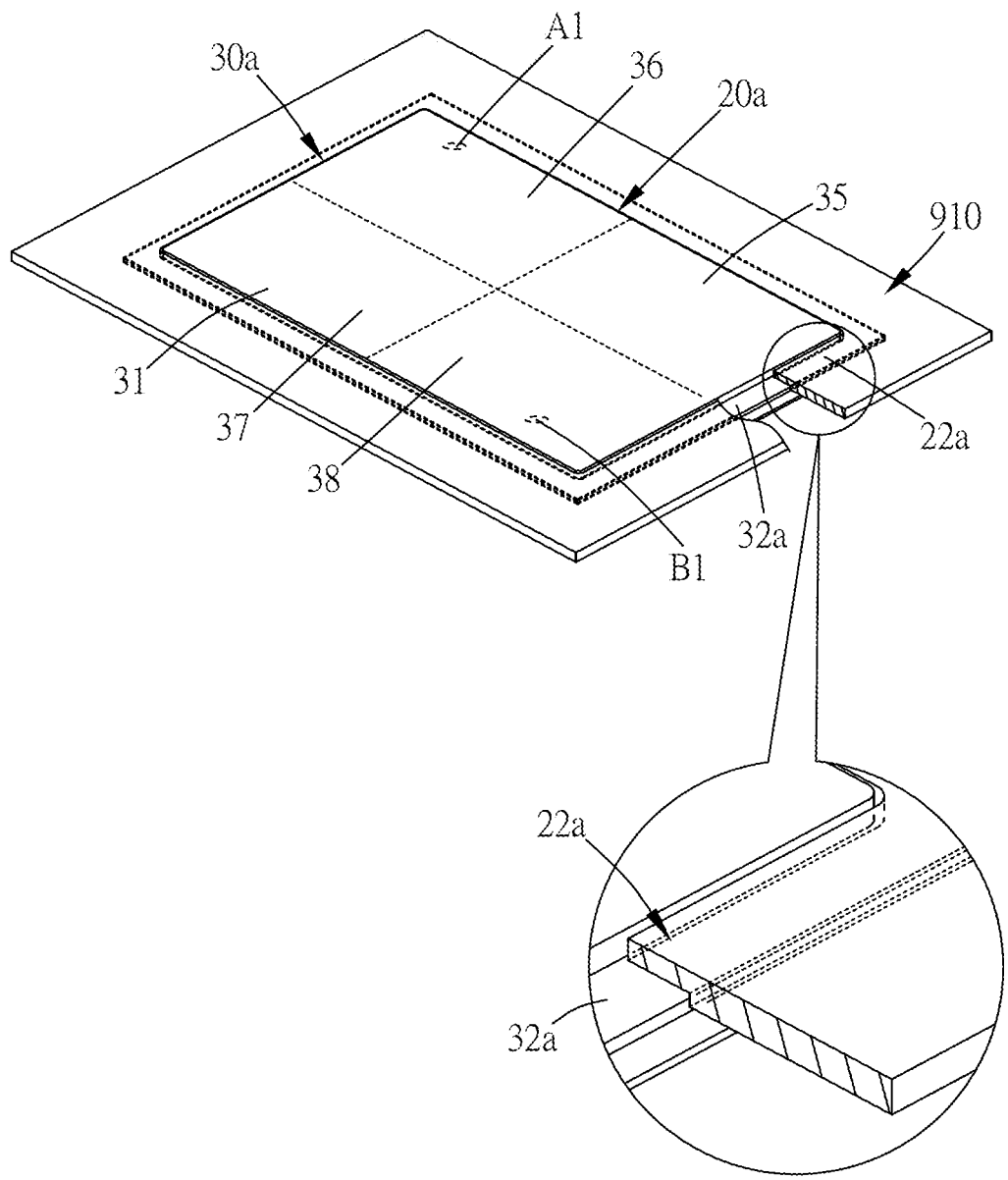
FIG. 5 illustrates a schematic drawing of a touch pad which is couple to a case in the second embodiment of the present invention.

Please refer to FIG. 4 to FIG. 5, which illustrate the touch-control electronic apparatus and the touch pad device in the second embodiment of the present invention. FIG. 4 illustrates an exploded assembly drawing of the touch pad device in the second embodiment of the present invention. FIG. 5 illustrates a schematic drawing of the touch pad which is combined with the case in the second embodiment of the present invention. In order to clearly describe the structure, FIG. 4 and FIG. 5 only illustrate a part of the case 910.

As shown in FIG. 4 and FIG. 5, the difference between the first embodiment and the second embodiment is that, in the touch pad device 1a of the second embodiment, the number of the case combining parts 22a is one, and the case combining part 22a is an annular recess. The number of the circuit board coupling parts 32a of the circuit board 30a is one, and the circuit board coupling part 32a is an annular plate. The circuit board coupling part 32a surrounds the edge of the circuit board main body 31. The case combining part 22a is coupled to the circuit board coupling part 32a. The number of the positioning connectors 50a is three, and the positioning connectors 50a are dot-shaped elastic viscose film. The three positioning connectors 50a are symmetrically disposed and corresponded to the center position of the circuit board 30.

When a pressing position of the circuit board main body 31 is pressed, at least one portion of the circuit board coupling part 32a will touch the edge of the opening 20a such that the circuit board 30a will tilt with that portion of the circuit board coupling part 32a as the pivot point. For example, when the pressing position A1 in the second area 36 of the circuit board main body 31 receives a pressing force, the portion closest to the symmetric point B1 (wherein the symmetric point B1 is located in the fourth area 38) opposite to the pressing position A1 on the circuit board coupling part 32a touches the case combining part 22 and forms a pivot point such that the circuit board main body 31 will tilt with the pivot point. Therefore, any position on the circuit board 30a can be pressed to tilt, the whole board of the circuit board 30a of the touch pad device 1a can be used for triggering the pressing the unit 34, and there is no spot which is insensitive to a press. It is to be known that the section tangent line and the shadow line on the case 910 shown in FIG. 4 and FIG. 5 are only used for clearly displaying the detailed shape of the case combining part 22a and that the section tangent line and the shadow line are not a part of the structure of the present invention.

Figure 6:
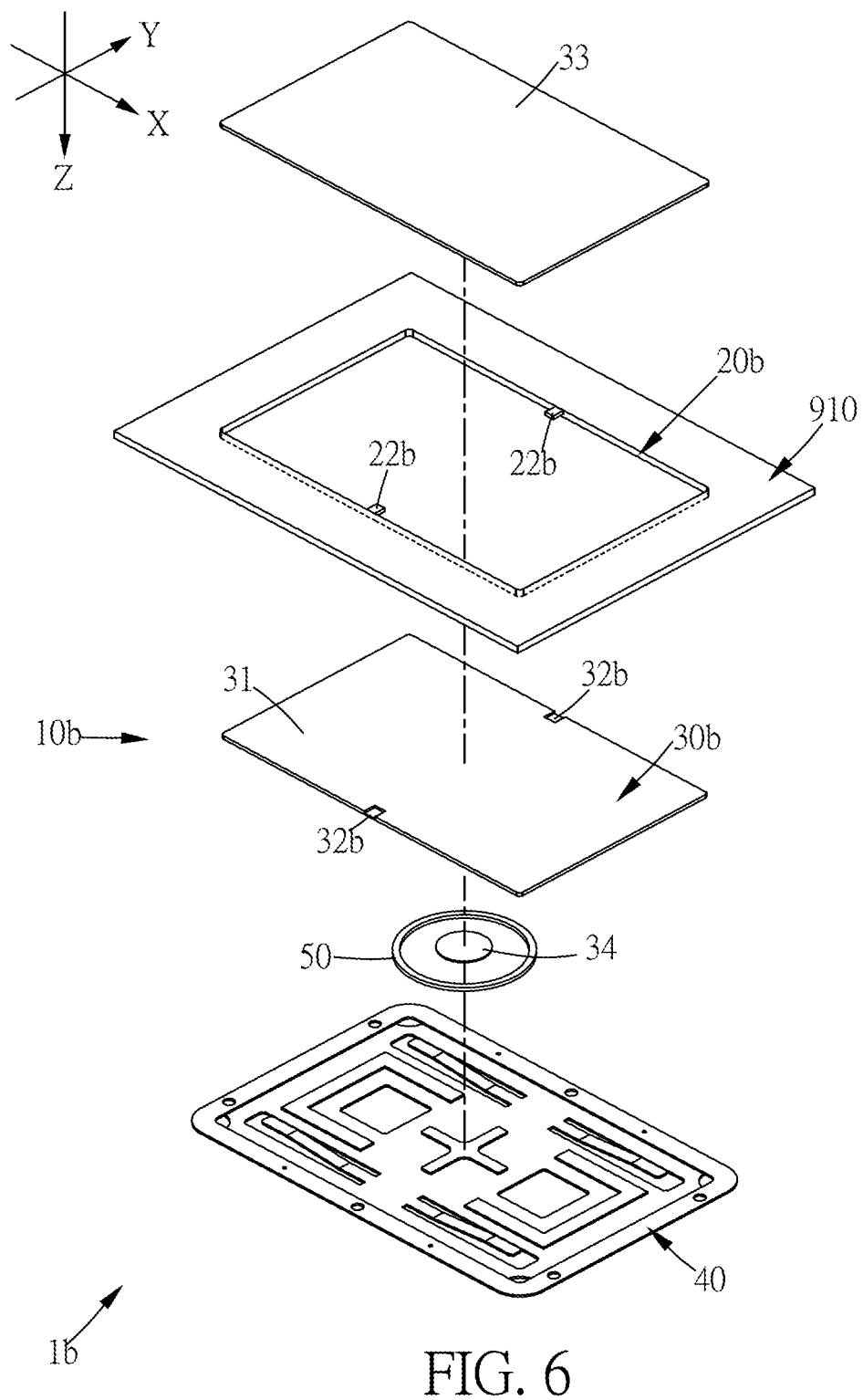
FIG. 6 illustrates an exploded assembly drawing of the touch pad device in the third embodiment of the present invention.

Please refer to FIG. 6, which illustrates the touch-control electronic apparatus and the touch pad device in the third embodiment of the present invention. FIG. 6 illustrates an exploded assembly drawing of the touch pad device in the third embodiment of the present invention. In order to clearly describe the structure, FIG. 6 only illustrates a part of the case 910.

As shown in FIG. 6, the difference between the first embodiment and the third embodiment is that, in the touch pad device 1b of the third embodiment, the number of the case combining parts 22b is two, each of the case combining parts 22b is a protruding dot, and each of the case combining parts 22b extends from the inner edge of the opening 22b along the Y axis shown in FIG. 6. (In another embodiment, each of the case combining parts 22b extends from the inner edge of the opening 22b along X axis shown in FIG. 6.) The number of the circuit board coupling parts 32b of the circuit board 30b is two, and each of the circuit board coupling parts 32b is a recess. The protruding dot of the case combining part 22b and the recess of the corresponding circuit board coupling part 32b are coupled to each other. The notch of the recess faces upward, and the notch of each of the recesses is also toward the outside of the case 910 along the Z axis shown in FIG. 6. When the circuit board 30b is pressed, the circuit board coupling parts 32b will cooperate with the pressing position to correspondingly form a pivot point such that the circuit board 30b will tilt relative to the pivot point.

Via the structural design of the touch-control electronic apparatus and the touch pad device of the present invention, any position on the whole board of the touch pad device can be used for triggering the pressing unit, and there is no spot which is insensitive to press, such that the whole board of the touch pad device can be fully utilized. In order to meet the trend of being light and thin, the size of the portable electronic device is reduced; thus, the object of the present invention is to provide a device for integrating touching and the function button, and the device has a small and thin shape and has no insensitive spots. By the use of the touch pad combining part as the pivot point, when the user presses any one of the four corners, symmetry can be achieved, and the method allows the pressing position to have more options.

What is claimed is:

1. A touch pad device adapted to be installed on a touch-control electronic apparatus, wherein the touch-control electronic apparatus comprises a case and the case comprises an opening, the touch pad device comprising:
   a touch pad, comprising a circuit board, wherein the circuit board comprises a circuit board main body and a plurality of circuit board coupling parts, the circuit board main body is exposed at the opening, the circuit board coupling parts are symmetrically disposed on an edge of the circuit board main body, and the circuit board coupling parts are coupled to the case;
   a supporting unit, located under the touch pad and supporting the touch pad, wherein the supporting unit comprises a supporting unit main body and at least one elastic part, the supporting unit main body is located under the circuit board main body, the at least one elastic part is connected between the supporting unit main body and the circuit board main body, and the supporting unit main body and the at least one elastic part are one-piece formed; and
   a pressing unit, located between the circuit board main body and the supporting unit;
   wherein when a pressing position on the circuit board main body is pressed, at least one of the circuit board coupling parts abuts against an edge of the opening such that the circuit board tilts with the at least one circuit board coupling part as a pivot point.

2. The touch pad device as claimed in claim 1, further comprising at least one positioning connector, wherein the at least one positioning connector is located between the circuit board main body and the supporting unit and connected to the circuit board main body and the supporting unit.

3. The touch pad device as claimed in claim 2, wherein the touch pad further comprises a protection board and the protection board covers the circuit board main body.

4. The touch pad device as claimed in claim 1, wherein the plurality of circuit board coupling parts are coupled to at least one case combining part of the case, and the at least one case combining part is disposed at an inner edge of the opening.

5. The touch pad device as claimed in claim 4, wherein each of the circuit board coupling parts is a protruding dot, and the at least one case combining part is a recess.

6. The touch pad device as claimed in claim 4, wherein a number of the at least one case combining part is plural, and the plurality of case combining parts are symmetrically disposed at the inner edge of the opening.

7. The touch pad device as claimed in claim 6, wherein each of the case combining parts is a protruding dot and each of the circuit board coupling parts is a recess.

8. A touch pad device adapted to be installed on a touch-control electronic apparatus, wherein the touch-control electronic apparatus comprises a case and the case comprises an opening, the touch pad device comprising:

a touch pad, comprising a circuit board, wherein the circuit board comprises a circuit board main body and a circuit board coupling part, the circuit board main body is exposed at the opening, the circuit board coupling part surrounds an edge of the circuit board main body, and the circuit board coupling part is coupled to the case;

a supporting unit, located under the touch pad and supporting the touch pad, wherein the supporting unit comprises a supporting unit main body and at least one elastic part, the supporting unit main body is located under the circuit board main body, the at least one elastic part is connected between the supporting unit main body and the circuit board main body, and the supporting unit main body and the at least one elastic part are one-piece formed; and a pressing unit, located between the circuit board main body and the supporting unit;

wherein when a pressing position on the circuit board main body is pressed, at least one area of the circuit board coupling part abuts against an edge of the opening such that the circuit board tilts with the at least one area of the circuit board coupling part as a pivot point.

9. The touch pad device as claimed in claim 8, wherein the circuit board coupling part is coupled to a case combining part of the case, the case combining part is disposed at an inner edge of the opening, the case combining part is an annular recess, and the circuit board coupling part is an annular plate.

10. A touch-control electronic apparatus, comprising:
a case, comprising an opening; and
a touch pad device, comprising:
  a touch pad, comprising a circuit board, wherein the circuit board comprises a circuit board main body and a plurality of circuit board coupling parts, the circuit board main body is exposed at the opening, the circuit board coupling parts are symmetrically disposed at an edge of the circuit board main body, and the circuit board coupling parts are coupled to the case;
  a supporting unit, located under the touch pad and supporting the touch pad, wherein the supporting unit comprises a supporting unit main body and at least one elastic part, the supporting unit main body is located under the circuit board main body, the at least one elastic part is connected between the supporting unit main body and the circuit board main body, and the supporting unit main body and the at least one elastic part are one-piece formed; and
  a pressing unit, located between the circuit board main body and the supporting unit;
wherein when a pressing position on the circuit board main body is pressed, at least one of the circuit board coupling parts abuts against an edge of the opening such that the circuit board tilts with the at least one circuit board coupling part as a pivot point.

11. The touch-control electronic apparatus as claimed in claim 10, wherein the touch pad device further comprises at least one positioning connector, and the at least one positioning connector is located between the circuit board main body and the supporting unit and connected to the circuit board main body and the supporting unit.

12. The touch-control electronic apparatus as claimed in claim 11, wherein the touch pad further comprises a protection board and the protection board covers the circuit board main body.

13. The touch-control electronic apparatus as claimed in claim 10, wherein the plurality of circuit board coupling parts are coupled to at least one case combining part of the case, and the at least one case combining part is disposed at an inner edge of the opening.

14. The touch-control electronic apparatus as claimed in claim 13, wherein each of the circuit board coupling parts is a protruding dot and the at least one case combining part is a recess.

15. The touch-control electronic apparatus as claimed in claim 13, wherein a number of the at least one case combining part is plural; the plurality of case combining parts are symmetrically disposed at the inner edge of the opening.

16. The touch-control electronic apparatus as claimed in claim 15, wherein each of the case combining parts is a protruding dot and each of the circuit board coupling parts is a recess.

17. A touch-control electronic apparatus, comprising:
a case, comprising an opening; and
a touch pad device, comprising:
  a touch pad, comprising a circuit board, wherein the circuit board comprises a circuit board main body and a circuit board coupling part, the circuit board main body is exposed at the opening, the circuit board coupling part surrounds an edge of the circuit board main body, and the circuit board coupling part is coupled to the case;
  a supporting unit, located under the touch pad and supporting the touch pad, wherein the supporting unit comprises a supporting unit main body and at least one elastic part, the supporting unit main body is located under the circuit board main body, the at least one elastic part is connected between the supporting unit main body and the circuit board main body, and the supporting unit main body and the at least one elastic part are one-piece formed; and
  a pressing unit, located between the circuit board main body and the supporting unit;
wherein when a pressing position on the circuit board main body is pressed, at least one area of the circuit board coupling part abuts against an edge of the opening such that the circuit board tilts with the least one area of the circuit board coupling part as a pivot point.

18. The touch-control electronic apparatus as claimed in claim 17, wherein the circuit board coupling part is coupled to a case combining part of the case, the case combining part is disposed at an inner edge of the opening, the case combining part is an annular recess, and the circuit board coupling part is an annular plate.

* * * * *